United States Patent [19]

Sakakiyama

[11] Patent Number: 4,831,896

[45] Date of Patent: May 23, 1989

[54] LINE PRESSURE CONTROL SYSTEM FOR AN AUTOMATIC TRANSMISSION

[75] Inventor: Ryuzo Sakakiyama, Tokyo, Japan

[73] Assignee: Fuji Jukogyo Kabushiki Kaisha, Tokyo, Japan

[21] Appl. No.: 90,614

[22] Filed: Aug. 28, 1987

[30] Foreign Application Priority Data

Sep. 10, 1986 [JP] Japan ............................... 61-213422

[51] Int. Cl.[4] ............................................. B60K 41/14

[52] U.S. Cl. ......................................... 74/856; 74/843

[58] Field of Search .................. 123/179 K X, 179 A, 123/179 B; 74/6, 843, 856, 850

[56] References Cited

U.S. PATENT DOCUMENTS 4,417,641 11/1983 Kageyama .

4,511,014 4/1985 Makita .

4,515,257 5/1985 Takano et al. ................ 192/21.5 X 4,546,073 10/1985 Shigematsu et al. ............. 74/856 X 4,702,083 10/1987 Nakamura et al. ............. 417/316 X

FOREIGN PATENT DOCUMENTS 57-101154 6/1982 Japan .

*Primary Examiner*—David A. Scherbel

*Assistant Examiner*—Creighton Smith

*Attorney, Agent, or Firm*—Martin A. Farber

[57] ABSTRACT

A microcomputer is provided for controlling an automatic transmission for a motor vehicle. The microcomputer operates to control line pressure in a hydraulic circuit for the automatic transmission. A control circuit is provided to respond to an output signal of the microcomputer for energizing a solenoid to control the line pressure. A driving circuit is provided to respond to closing operation of a starting motor switch of an engine to energize the solenoid to reduce the line pressure.

4 Claims, 3 Drawing Sheets

CPU
RESET
ROM
RAM
OUTPUT INTERFACE
CHANGE SPEED CONTROL SOLENOID
LOCK UP SOLENOID
LINE PRESSURE CONTROL CIR.
DRIVING CIR.
A/D
INPUT INTERFACE
THROTTLE POSITION SENSOR
OIL TEMPERATURE SENSOR
VEHICLE SPEED SENSOR
ENGINE SPEED SENSOR
DRIVING RANGE SELECTION SENSOR
STARTING MOTOR SWITCH
31
32
33
34
35
36
37
38
39
40
41
42
43
44
45
46
48

LINE PRESSURE CONTROL SYSTEM FOR AN AUTOMATIC TRANSMISSION

BACKGROUND OF THE INVENTION

The present invention relates to a line pressure control system for an automatic transmission for a vehicle.

Japanese Patent Application Laid-Open No. 57-101154 discloses a control system in which a line pressure control valve is provided for controlling line pressure of an automatic transmission by an output signal from a computer such that the line pressure is controlled in proportion to throttle valve opening degree and vehicle speed. Generally, the electronic control system is arranged such that if supply voltage from a battery drops because of increase of engine load and inactivation of the battery at cold engine, the microcomputer is reset. In the reset state, the line pressure is not controlled by the microcomputer. In order to ensure the starting of the engine and driving of the vehicle, an electrical circuit is provided to control the line pressure to a maximum value. However, at cranking of the engine, if the line pressure is high, pumping loss of an oil pump becomes large. The pumping loss affects a starting of the engine. Therefore, it is preferable that the line pressure is low at cranking in order to prevent the pumping loss.

SUMMARY OF THE INVENTION

The object of the present invention is to provide a line pressure control system which may improve a starting characteristic of the engine at cranking.

In accordance with the present invention, an electric circuit is provided to reduce the line pressure when a starting motor switch of an engine is closed for starting the engine.

According to the present invention, there is provided a line pressure control system for an automatic transmission for a motor vehicle, the vehicle having a microcomputer which operates to control line pressure in a hydraulic circuit for the automatic transmission in accordance with driving conditions of the motor vehicle.

The other objects and features of this invention will become understood from the following description with reference to the accompanying drawings.

DETAILED DESCRIPTION OF THE PREFERRED EMBODIMENT

Figure 1:
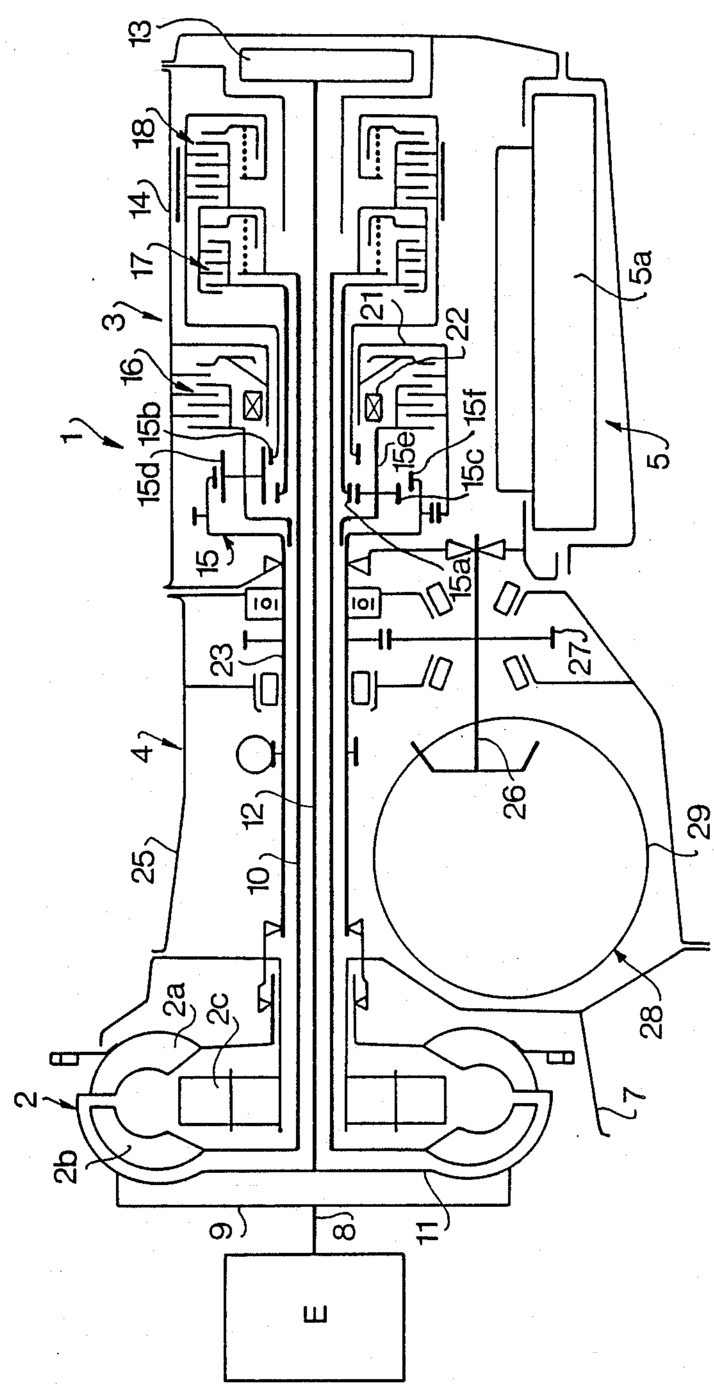
FIG. 1 shows an automatic transmission to which the present invention is applied.

Explaining briefly the construction of an automatic transmission with reference to FIG. 1, an automatic transmission 1 comprises a torque converter 2, an automatic transmission device 3, a final reduction gear 4 and a pressure oil control device 5 for pressure oil. The control device 5 is provided in a housing 5*a*.

The torque converter 2 comprises an impeller 2*a*, a turbine 2*b* and a stator 2*c*. The impeller 2*a* is connected to a crank shaft 8 of an engine E through a drive plate 9 and a turbine shaft 10 secured to the turbine 2*b* is extended to the automatic transmission device 3. As is well known, the power of the engine is transferred to the turbine shaft 10 according to the load. A cover 11 secured to the drive plate 9 is connected to an oil pump-driving shaft 12 which passes through the turbine shaft 10 and is coupled to an oil pump 13 provided in the rear portion of the automatic transmission device 3. Thus, the oil pump 13 is driven by the engine.

The automatic transmission device 3 comprises a planetary gear device 15 and a plurality of fluid operated means for producing various operational ranges. The fluid operated means comprises a low and reverse brake 16, a forward clutch 17 and a reverse clutch 18. The turbine shaft 10 is connected to a forward sun gear 15*a* of the planetary gear 15 through the forward clutch 17 and is further connected to a reverse sun gear 15*b* through the reverse clutch 18. By actuating the clutches 17 and 18 with line pressure, the power of the turbine shaft 10 is transmitted to the sun gear 15*a* or 15*b*.

In connection with the planetary gear 15, a short pinion 15*c* and a long pinion 15*d* are supported by a carrier 15*e* on which the low and reverse brake 16 is provided. Between the brake 16 and a center support 21, a one-way clutch 22 is provided. The carrier 15*e* may be locked by operation of the brake 16 and one-way clutch 22. The ring gear 15*f* of the planetary gear 15 is connected to an output shaft 23 mounted on the turbine shaft 10.

The output shaft 23 is rotatably supported in the case 25 between a housing 7 of the torque converter 2 and the case 14 of the automatic transmission device 3.

The final reduction gear 4 for the front wheel drive comprises a drive pinion 26 and a crown gear 29 of a differential 28. The drive pinion 26 is driven by the output shaft 23 through a reduction gear 27.

Figure 2:
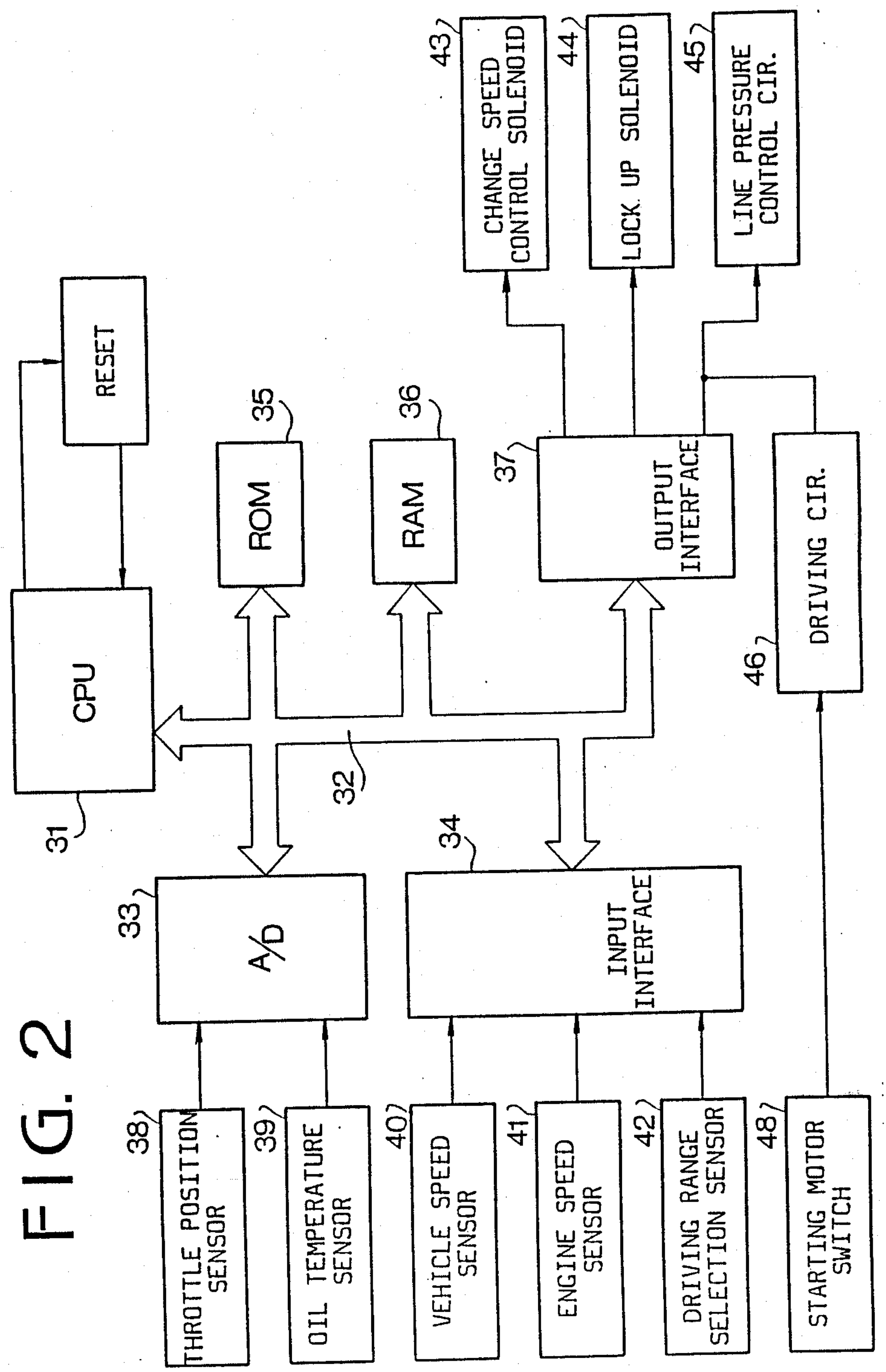
FIG. 2 is a block diagram showing a control system.

Referring to FIG. 2 a microcomputer has a central processor unit CPU 31, an A/D converter 33, an input interface 34, ROM 35, a RAM 36, an output interface 37, and a bus 32 connected between these elements. Output signals from a throttle position sensor 38 and an oil temperature sensor 39 are applied to the A/D converter 33. Output signals from a vehicle speed sensor 40, an engine speed sensor 41, and a driving range selection sensor 42 are applied to the input interface 34. The driving range selection sensor 42 produces output signals dependent on selected driving ranges such as D-range, R-range and neutral (N) range. Output signals of the output interface 37 are supplied to changing speed control solenoids 43, a torque converter lockup solenoid 44, and a line pressure control circuit 45. A driving circuit 46 for driving a line pressure control solenoid in 50 the circuit 45 is provided to be supplied with an output signal of a starting motor switch 48.

Figure 3:
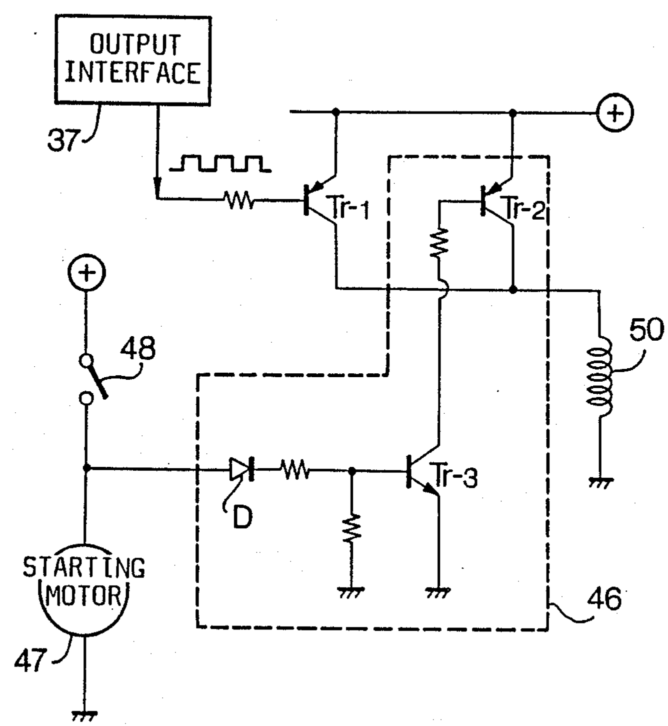
FIG. 3 is a circuit showing a part of the control system.

Referring to FIG. 3, the line pressure control circuit 45 comprises a PNP transistor Tr-1 and a line pressure control solenoid 50 connected to the transistor Tr-1 in series. The base of the transistor is connected to an output of the output interface 37. The driving circuit 46 comprises a PNP transistor Tr-2 connected to the transistor Tr-1 in parallel, and an NPN transistor Tr-3 connected between the base of transistor Tr-2 and the ground. The base of the transistor Tr-3 is connected to the starting motor switch 48 through a diode D.

Figure 4:
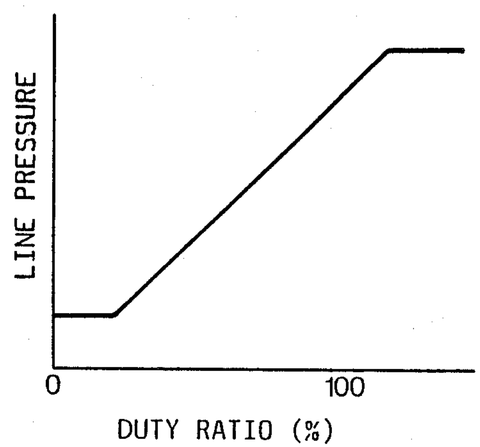
FIG. 4 is a graph showing a line pressure characteristic dependent on a duty ratio.

In operation, an output pulse signal from the output interface 37 is supplied to the base of transistor Tr-1. When a higher voltage of the pulse signal is applied to the base of the transistor Tr-1, the transistor is turned off, and when the voltage becomes lower, the transistor is turned on to energize the line pressure control solenoid 50. When the period of the energization of the solenoid 50 becomes short, the line pressure increases. In other words, the line pressure increases with increase of the duty ratio of the pulses applied to the base of transistor Tr-1. FIG. 4 shows the relationship between the line pressure and the duty ratio. The central processor unit 31 operates in accordance with input signals from sensors 38 to 42 and the output interface 37 produces output signals which are applied to the solenoids 43 and 44. The solenoids 43 operate to control valves in the control device 5 to change the transmission ratio of the automatic transmission, and solenoid 44 operates to lock up the torque converter 2. The line pressure is controlled by the output signal of the output interface 37.

If the voltage of the battery reduces to a predetermined value (for example 8 volts) by an abnormal condition such as cold engine operation, the microcomputer is reset. In the reset state, output interface 37 produces the output pulses at the duty ratio of 100%, which are fed to the base of transistor Tr-1. The base voltage of the transistor Tr-1 goes to a high level, so that the transistor Tr-1 is turned off. Thus, the current for driving the line pressure control solenoid 50 is cut off, so that the line pressure becomes a maximum value in order to provide a fail safe operation.

If cranking of the engine is done in the reset state, the line pressure becomes a minimum value, as described hereinafter.

If the starting motor switch 48 is turned on at the cranking, the switch 48 is closed, so that the voltage applied to a starting motor 47 is applied to the base of transistor Tr-3. The transistor Tr-3 is turned on, thereby turning on the transistor Tr-2. Accordingly, the current flows in the line pressure control solenoid 50 to energize it to decrease the line pressure to a minimum value.

Since discrete elements are operated at a low voltage compared with the voltage for operating the microcomputer, the system of FIG. 3 can be operated in the reset state.

Thus, during the cranking, the line pressure is held to a minimum, thereby preventing the pumping loss due to the oil pump 13.

From the foregoing, it will be understood that the present invention provides a line pressure control system which may exactly reduce the line pressure in cranking of the engine, thereby to prevent the pumping loss.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A line pressure control system for an automatic transmission for a motor vehicle having an engine, a starting motor operated by closing of a starting motor switch for starting the engine, and a microcomputer supplied with voltage from a battery and controlling line pressure in a hydraulic circuit for the automatic transmission in accordance with driving conditions of the motor vehicle, the system comprising:

a solenoid for controlling the line pressure;

a control circuit response to an output signal of the microcomputer for energizing the solenoid to control the line pressure;

said microcomputer being responsive to the voltage being reduced to a predetermined value for producing an abnormal signal;

said control circuit constituting a fail safe circuit responsive to the abnormal signal for setting a maximum value of the line pressure via said solenoid to insure the starting of the engine and driving of the vehicle; and a driving circuit electrically connected to the control circuit and to the starting motor switch and for operating the solenoid to reduce the line pressure from the maximum value to a minimum value at closing of the starting motor switch so as to reduce pumping loss of the automatic transmission.

2. The system according to claim 1 wherein the output signal of the microcomputer is pulses, the duty ratio of which is controlled to control the energization of the solenoid.

3. The system according to claim 2 wherein the control circuit includes a transistor responsive to the pulses to intermittently energize the solenoid, and the driving circuit includes transistors responsive to the operation of the starting motor switch to operate the solenoid.

4. In a line pressure control system for an automatic transmission for a motor vehicle having an engine, a starting motor for starting the engine, starting signal producing means responsive to an output signal of the starting motor for producing a starting signal, and line pressure deciding means operated by voltage from a battery and for deciding line pressure in accordance with driving conditions of the motor vehicle, the improvement in the system which comprises:

abnormal condition detecting means responsive to the voltage being reduced to a predetermined value for producing an abnormal signal;

fail safe means responsive to the abnormal signal for setting a maximum line pressure to insure the starting of the engine and driving of the vehicle; and means responsive to the starting signal for reducing the maximum line pressure to a minimum line pressure so as to reduce pumping loss of the automatic transmission at the maximum line pressure of the abnormal condition.

* * * * *